United States Patent [19]

Cieslak et al.

[11] Patent Number: 5,002,843
[45] Date of Patent: Mar. 26, 1991

[54] SEPARATOR MATERIAL FOR ELECTROCHEMICAL CELLS

[76] Inventors: Wendy R. Cieslak, 1166 Laurel Loop NE., Albuquerque, N. Mex. 87122; Leonard J. Storz, 2215 Ambassador NE., Albuquerque, N. Mex. 87112

[21] Appl. No.: 367,572

[22] Filed: Jun. 12, 1989

[51] Int. Cl.$^5$ ............................................. H01M 10/36
[52] U.S. Cl. .................................... 429/101; 429/254
[58] Field of Search ........................ 429/196, 51, 101

[56] References Cited

U.S. PATENT DOCUMENTS

| | | | |
|---|---|---|---|
| 3,904,437 | 9/1975 | Specker | 136/103 |
| 3,922,174 | 11/1975 | Heller | 429/196 |
| 4,104,340 | 8/1978 | Ward | 264/13 |
| 4,272,560 | 6/1981 | Baczek et al. | 204/296 |
| 4,283,469 | 8/1981 | Goebel et al. | 429/196 |
| 4,387,144 | 6/1983 | McCallum et al. | 429/251 |
| 4,405,700 | 9/1983 | Rampel | 429/248 |
| 4,407,910 | 10/1983 | Catanzarite | 429/57 |
| 4,485,155 | 11/1984 | Holl et al. | 429/196 |
| 4,555,454 | 11/1985 | Shuster | 429/51 |
| 4,598,029 | 7/1986 | Doddapaneni et al. | 429/50 |
| 4,629,666 | 12/1986 | Schlaikjer | 429/194 |
| 4,643,956 | 2/1987 | Sandelli et al. | 429/34 |
| 4,664,992 | 5/1987 | Edwards et al. | 429/144 |
| 4,755,429 | 7/1988 | Nickols et al. | 428/408 |

*Primary Examiner*—Donald L. Walton

[57] ABSTRACT

An electrochemical cell characterized as utilizing an aramid fiber as a separator material. The aramid fibers are especially suited for lithium/thionyl chloride battery systems. The battery separator made of aramid fibers possesses superior mechanical strength, chemical resistance, and is flame retardant.

3 Claims, No Drawings

SEPARATOR MATERIAL FOR ELECTROCHEMICAL CELLS

The government has rights in this invention pursuant to contract number DE-AC04-76DP00789 awarded by the U.S. Department of Energy to AT&T Technologies, Inc.

BACKGROUND OF THE INVENTION

The present invention relates generally to electrochemical cells and more particularly to a separator material comprising aramid fibers for use in a lithium/thionyl chloride system.

A fundamental requirement of a battery separator is to separate the positive and negative terminals of a given battery. The separator must be permeable to allow the passage of electrolytic substances so that ion exchange reactions can occur between the terminals. However, in some battery systems, a harsh environment is present within the cells. Many materials which provide good results in one system may be chemically active in other battery systems. Further, the materials used for the separator are likely to be exposed to highly corrosive liquids present in the cells.

The separator material must not only withstand harsh conditions in the battery cell, but also must be able to withstand fabrication. During cell fabrication, separator materials are subjected to a rolling process which involves a considerable amount of pulling and stretching of the material. For example, in spiral wound cells, strips of anode, cathode and separator material are rolled together in a "jelly roll" fashion and then inserted in a metal can which is then filled with an appropriate electrolyte. Damage to the material during this operation can result in an open structure that may produce shorting in the cell.

Thus, it is desirable to utilize a material which has both excellent mechanical properties and excellent resistance to chemicals present in the battery cell. The combination of these properties is necessary to provide a battery which will have an extended life. However, the materials which meet the above criteria are limited.

In particular, there are very few materials which can be employed as separator materials in lithium/thionyl chloride battery systems due to the inherently harsh environment present within the cells. Lithium is an extremely reactive metal, and materials which may be suitable for use as separators in many battery systems cannot be used in systems with lithium. Further, even if a material is found which does not react with lithium, the material may react with the thionyl chloride ($SOCl_2$) electrolyte, and would thus not be suitable.

Also, degradation of many common separator materials, such as polyethylene, excludes their use in $SOCl_2$ electrolytes. Degradation of the binder in an otherwise chemically-resistant separator may also eliminate it for use in such an aqueous environment. For example, U.S. Pat. No. 4,405,700 to Rampel discloses a diacetone acrylamide as a coating for a separator and U.S. Pat. No. 3,904,437 to Specker discloses a polyacrylamide as a component of a battery separator. However, such materials are not suited for lithium/thionyl chloride systems.

Further, abnormal uses (e.g., high rate, over discharge, charge) of the lithium/thionyl chloride cells may cause high temperature excursions, causing the lithium within the cell to be in a molten state. This not only increases the likelihood of chemical reactions and the possibility of fire, but also presents the problem of the molten lithium migrating to the cathode. Even in reserve configurations, degradation may occur by reaction with lithium.

U.S. Pat. No. 4,629,666 to Schlaikjer discloses separators which are suitable for electrochemical cells which contain reactive metals such as lithium and strong oxidants. The separator is a substantially continuous microporous film comprising a polymer of ethylene and a fully halogenated analogue of ethylene (e.g., Tefzel). However, Tefzel is limited in the temperatures in which it retains its mechanical integrity.

Many ceramics are known to be thermodynamically or kinetically stable with lithium. However, these materials possess poor mechanical integrity or impurities which render them less attractive. Ceramic separators have been proposed by Goebel et al in U.S. Pat. No. 4,283,469, Catanzarite in U.S. Pat. No. 4,407,910 and Doddapaneni et al in U.S. Pat. No. 4,598,029.

SUMMARY OF THE INVENTION

It is an object of the present invention to overcome the above-identified shortcomings of the prior art by providing a separator material for an electrochemical cell which has superior mechanical strength and chemical resistance compared to other known materials, and which is flame retardant.

It is therefore a primary object of the present invention to provide a separator material for separating positive and negative terminals which will not react with chemical reagents present in the battery system, and yet permit ion exchange reactions between the positive and negative terminals of the battery.

It is another object of the invention to provide a separator material having superior mechanical properties to withstand pulling and stretching incurred during fabrication of the battery.

It is another object of the invention to provide a separator which is flexible and strong enough for a spiral-wound cell and which has a proper thickness and porosity for optimum performance.

It is also an object of the present invention to provide a separator material which enhances the safety of the battery, by providing a material which is stable to heat and which is also a flame retardant.

According to the invention, an aramid fiber is utilized as a separator material in the electrochemical cell. The invention is especially suited for use in lithium/thionyl chloride battery systems.

These and other objects, features and advantages of the present invention will be seen more clearly by reference to the following detailed specification.

DETAILED DESCRIPTION OF THE PREFERRED EMBODIMENT

A conventional electrochemical cell comprises two electrically isolated terminals in a container having an anode connected to one terminal and a cathode connected to the other terminal. Fluid electrolyte having an ionizable solute dissolved in the electrolyte is provided in contact with the anode and the cathode. A separator is provided in the electrochemical cell positioned between the anode and the cathode.

The electrochemical system described above may take a variety of different forms. For example, the anode can be formed of an oxidizable active alkaline metal such as lithium. Lithium possesses high electropositivity and low equivalent weight which makes it an ideal battery reactant. Liquid catholytes can be utilized such as $SO_2$, $SO_2Cl_2$ and $SOCl_2$. $SO_2Cl_2$ and $SOCl_2$ have the advantage of being good solvents for the required salt and of reducing to another liquid which also dissolves the salt. Therefore, they can serve a dual role as catholyte and electrolyte solvent.

The above-described non-aqueous battery includes thermally activated types wherein the salt is heated to the melting point to form a liquid electrolyte. Thus, the lithium may become molten. Operating temperatures of 300° C. may be necessary in the cell, and the requirement for a thermally stable and flame retardant separator material becomes extremely important.

The separator of the present invention is made of an aramid fiber and can be utilized in the above-described conventional electrochemical cells. Aramid fibers are a generic class of fibers whose technical name is "aromatic polyamide", produced by a reaction of paraphenylenediamine and terephthaloyl chloride, given the designation "aramid" by the Federal Trade Commission as published in the Federal Register, Volume 38, No. 237, Dec. 11, 1973 at page 34112 et seq. The definition of aramid fibers as stated in the amendment to the Textile Fiber Products Identification Act is "a manufactured fiber in which the fiber-forming substance is a long chain synthetic polyamide in which at least 85% of the amide:

linkages are directly attached to two aromatic rings." Aramid fibers include poly(p-phenylene terephthalamide) (KEVLAR), and poly(m-phenylene isophthalamide) (NOMEX).

A battery separator used in this application is meant to refer to an insulating material which physically separates the positive and negative terminals of a given battery, and yet is permeable enough to allow the passage of an electrolytic substance so that ion exchange reactions can occur between the terminals. The use of aramid fibers as a battery separator material is most preferably employed in a lithium/thionyl chloride battery system due to their excellent mechanical and chemical properties in such a system.

The present invention will now be described in reference to the aramid fiber poly(p-phenylene terephthalamide), also known as KEVLAR.

KEVLAR has been used in the aerospace and sporting goods industries, and has been used successfully as a material for making bullet-proof vests. KEVLAR is an organic fiber having exceptional strength and stiffness (modulus) coupled with a low density. The fibers are stronger, stiffer and less dense than glass fibers, such as those in the family of borosilicate glasses which have been used as separator materials in the lithium battery systems. KEVLAR has a high strength of approximately 22 grams per denier, which is more than five times the strength of steel wire of the same weight and more than twice the strength of industrial nylon, polyester and fiberglass materials. It has an unusually high initial modulus of 476 grams per denier which is about twice that of steel or fiberglass. Elongation of KEVLAR is low (only about 4%). The excellent mechanical properties of KEVLAR minimizes the likelihood of damage during cell fabrication, which may result in an open structure that may produce shorting in the cell.

KEVLAR has superior resistance to most chemical reagents. KEVLAR is stable in thionyl chloride at both room temperature and 50° C. KEVLAR has an outstanding stability to heat, and retains as much as 95% of strength after exposure to temperatures of 500° F., and also exhibits good stability to temperatures above that level. KEVLAR is also a flame retardant material.

In comparison with other fabrics which are routinely used in batteries (such as borosilicate glasses), KEVLAR has superior mechanical strength, and better chemical resistance. Thus, KEVLAR possesses many advantages over other materials, especially in regard to safety concerns.

A better understanding of the invention can be made by reference to the following compatibility experiments conducted in $LiAlCl_4/SOCl_2$ electrolyte and in contact with Li (no electrolyte).

Numerous materials are subjected to a vial test, differential scanning calorimetry (DSC) and laboratory cell tests. It is not necessary for all materials to be subjected to all the tests, because failure to pass a single test constitutes rejection of the material.

The vial tests involve placing a small piece (about 1 $cm^2$) of the material in a 40 ml vial. About 5 ml of 1.4 M $LiAlCl_4/SOCl_2$ is added and the vial is closed with a Teflon-lined screw cap. Any immediate reactions are noted, and the vial is frequently checked for the next several days. If the material appears to be stable, the vial is then stored at 50° C. and monitored for reactions.

In the DSC tests, the sample is laid in a molybdenum pan. Lithium is placed on top of the sample, and the pan is crimp-sealed in a glove box. The temperature is ramped at a rate of 5° C. per minute to 300° C. and then back to room temperature. Heat is measured with 5 mcal sensitivity. The thermal cycle may be repeated or the procedure modified for some samples, if necessary. The test is conducted well above the melting temperature of lithium (180.5° C.) to reveal potential reactions under cell abuse conditions. The purpose of this test is to identify reactions with lithium. The laboratory cell tests involve assembling a laboratory flat-plate cell with the experimental material to ascertain whether the material functions as a separator. Cells are discharged through resistive load at rates from about 4 to 20 $mA/cm^2$ and temperatures from $-40°$ C. to 25° C.

In the vial tests, the following materials showed no visible evidence of reaction after at least two months at 50° C.:
SciMAT Tefzel microporous membrane
KEVLAR
NOMEX
Hollingsworth & Vose Co. binder-free borosilicate glass paper, BG 03005
Whatman Ltd. binder-free borosilicate glass filter paper, 1827
Whatman Manufacturing, Inc. binder-free borosilicate glass papers, BS series
Zircar Products, Inc. binder-free Alumina paper
Zircar Products, Inc. binder-free Yttria felt
Zircar Products, Inc. binder-free Zirconia cloth
  The following materials failed the vial test:
    All glass or ceramic products with polypropylene or unidentified organic binders.
  The following are the results of the DSC tests:

Tefzel showed no reactivity with lithium, but melted at about 265° C. The fused Tefzel appeared as a balled-up translucent brown mass on disassembly.

KEVLAR and NOMEX aramid fiber products showed slight reactivity beginning close to 300° C.

Hollingsworth & Vose Co. binder-free borosilicate glass paper BG 03005 reacted with molten lithium.

Whatman BS series displayed less heat released than the very reactive borosilicates, but still charred extensively.

Whatman 1827 (Laboratory filter product) showed no noticeable peak on the DSC trace and only slight blackening at the edges of the Li.

Zircar Zirconia showed no evidence of reaction. The mat was still white and substantially whole on disassembly, but the intimate contact with fused Li made it very difficult to separate the components without tearing pieces apart.

Zircar Alumina showed no evidence of reaction. Like the Zirconia, the mat remained substantially whole.

Zircar Yttria showed no evidence of reaction although the fabric had become merely a powder.

Of the polymeric materials tested, only Tefzel and the aramid fiber products performed as well as or better than the glasses and ceramics, which all functioned properly.

Performance of the separator, of course, is a function of the thickness, density and pore size of the separator, and selection of these properties must be based on programmatic objectives (safety, rates, temperatures, etc.). However, in general, the ceramics are too fragile and too thick for uses in high-rate spiral cells.

The results of the above tests are summarized in Table I. In Table I, P=passed, M=Marginal, and F=Failed. Those materials categorized as "F" are not recommended for use in $Li/SOCl_2$ cells, while the others may be considered for specific needs.

TABLE 1

SUMMARY OF RESULTS

| Material | Vial Test | DSC Test | Lab Cell | Overall Comments |
| --- | --- | --- | --- | --- |
| Polymers | | | | |
| KEVLAR | P | M/P | P | M/P |
| NOMEX | P | M/P | P | M/P |
| Glasses | | | | |
| Glass w/binder | F | F | P | F |
| H&V BG-03005 | P | F | P | F |
| Whatman BS | P | M/F | P | M |
| Whatman 1827 | P | M/P | P | M/P |
| Ceramics | | | | |
| Alumina | P | P | P | P - weak |
| Yttria | P | P | P | P - weak |
| Zirconia | P | P | P | P - weak |

KEVLAR and NOMEX were found to have particularly outstanding properties in the $Li/SOCl_2$ system.

While the present invention has been described with reference to a particular preferred embodiment, the invention is not limited to the specific examples given, and other embodiments and modifications can be made by those skilled in the art without departing from the spirit and scope of the invention.

What is claimed is:

1. A lithium/thionyl chloride battery comprising an aramid fiber mat separator.

2. The battery of claim 1, wherein said aramid fiber is poly(p-phenylene terephthalamide).

3. The battery of claim 1, wherein said aramid fiber is poly(m-phenylene isophthalamide).

* * * * *